(12) United States Patent
Murata et al.

(10) Patent No.: US 8,360,656 B2
(45) Date of Patent: Jan. 29, 2013

(54) BEARING APPARATUS

(75) Inventors: Junji Murata, Kashiba (JP); Kazuyoshi Yamakawa, Nishinomiya (JP)

(73) Assignee: JTEKT Corporation, Osaka (JP)

( * ) Notice: Subject to any disclaimer, the term of this patent is extended or adjusted under 35 U.S.C. 154(b) by 838 days.

(21) Appl. No.: 12/314,072

(22) Filed: Dec. 3, 2008

(65) Prior Publication Data

US 2009/0142013 A1 Jun. 4, 2009

(30) Foreign Application Priority Data

Dec. 4, 2007 (JP) ................................. 2007-313561

(51) Int. Cl.
F16C 33/58 (2006.01)
(52) U.S. Cl. ....................................................... 384/570
(58) Field of Classification Search .................. 384/568, 384/570
See application file for complete search history.

(56) References Cited

U.S. PATENT DOCUMENTS

| 3,140,130 | A | * | 7/1964 | Barr ............................ 384/570 |
| 5,711,074 | A | | 1/1998 | Harimoto et al. |
| 7,270,484 | B2 | | 9/2007 | Waseda |
| 2005/0265644 | A1 | | 12/2005 | Waseda |

FOREIGN PATENT DOCUMENTS

| DE | 857455 | 12/1952 |
| EP | 1 600 648 A2 | 11/2005 |
| GB | 258809 | 9/1926 |
| JP | 5-10826 | 2/1993 |
| JP | 7-317778 | 12/1995 |
| JP | 2000-161367 A | 6/2000 |
| JP | 2001-41250 | 2/2001 |
| JP | 2005-337352 | 12/2005 |
| JP | 2005-337352 A | 12/2005 |
| JP | 2006-170419 | 6/2006 |
| JP | 2006-336765 | 12/2006 |
| JP | 2007-303598 | 11/2007 |

OTHER PUBLICATIONS

Notification of Reasons for Refusal dated Sep. 6, 2011 (with an English translation).
European Search Report dated Jul. 16, 2012.

* cited by examiner

*Primary Examiner* — Thomas R Hannon
*Assistant Examiner* — Phillip A Johnson
(74) *Attorney, Agent, or Firm* — McGinn IP Law Group, PLLC

(57) ABSTRACT

A bearing apparatus includes two split outer ring halves disposed in close contact with each other and a plurality of rollers. A circumferential end of each of the split outer ring halves has a concave-and-convex shape including a first slope portion inclined with respect to a line extending along an axial direction of the split outer ring halves and a second slope portion inclined in an opposite direction to that of the first slope portion. Each of the rollers is provided with crowning so as to be shaped in barrel form, and an amount of crowning is set such that an apex of a projecting portion at the concave-and-convex shape of each of the split outer ring halves is located on an axially outer side of a rolling surface of the roller rolling on an inner peripheral surface of each of the split outer ring halves.

9 Claims, 8 Drawing Sheets

(a)

(b)

BEARING APPARATUS

BACKGROUND OF THE INVENTION

The present invention relates to a bearing apparatus, and more particularly to a bearing apparatus including a split-type rolling bearing and a housing which supports the rolling bearing.

In an engine of such as an automobile or a marine vessel, a bearing for supporting a crankshaft which converts the reciprocating motion of a piston into rotational motion is disposed between adjacent counterweights or between a counterweight and a large end of a connecting rod, so that a split bearing which is circumferentially split in two halves is used.

Sliding bearings have conventionally been used as the aforementioned supporting bearings. However, since there has been an increasing demand for engines with less fuel consumption in recent years, the use of rolling bearings which are circumferentially split in place of the aforementioned sliding bearings has been proposed to reduce the rotational loss.

This split-type rolling bearing has, for example, a pair of split outer ring halves, a plurality of rollers disposed so as to be cable of rolling on the respective inner surfaces of the both split outer ring halves, and a pair of split cage halves for retaining the respective rollers so as to dispose them at substantially equal intervals in the circumferential direction. Further, a crankshaft is fitted in the rolling bearing as an inner ring member.

The aforementioned split outer ring halves can be obtained by fabricating a cylindrical outer ring from a bearing steel and subsequently by slitting that cylindrical outer ring into two halves. As a method of splitting the cylindrical outer ring into two halves, a method is known in which a notch for inducing a split is formed in a portion of the cylindrical outer ring, and the outer ring is split by applying an external force thereto by a press (e.g., refer to JP-A-7-317778).

However, with such a splitting method, in most cases a crack produced from the notch extends straightly along the axial direction. For this reason, in a case where a split roller bearing using the split outer ring halves obtained is incorporated in a portion to be used, there is a problem in that the pair of split outer ring halves are liable to be offset in the axial direction. If an offset occurs in the split outer ring halves, there is a possibility that noise and vibration can occur when the rollers roll in the vicinity of mating surfaces of the outer ring halves where this offset has occurred.

Accordingly, to suppress such an axial offset of the outer ring halves, a split outer ring half has been proposed at least a circumferential end of which has a concave-and-convex shape including a slope portion inclined with respect to a line extending along the axial direction and a slope portion inclined in the opposite direction to that of this slope portion (e.g., refer to JP-A-2005-337352). The split outer ring half in JP-A-2005-337352 is fabricated by cutting a hoop material made of a metallic material such as JIS Standard SCM 415 by a punching tool to obtain a blank material, by applying this blank material to a cylindrical receiving metal fitting, and by curving it into a substantially semicylindrical shape by using an appropriate bending tool. FIG. 8 shows an example of a split outer ring half 40 thus fabricated. If such split outer ring halves 40 are used, since the aforementioned concave-and-convex shapes mesh with each other at the mating surfaces, it is possible to prevent the pair of split outer ring halves from being axially offset. In addition, it is considered that even in a case where a radial offset has occurred at the mating surfaces and a radially stepped portion has occurred between circumferential end portions of the opposing split outer ring halves, since each roller obliquely hits against an edge 41a of a slope portion 41 and gradually rides over the stepped portion, thereby making it possible to alleviate the impact energy and suppress the noise and vibration.

However, although the rolling roller initially collides against an apex 42 of the projecting portion, the contact area between this apex 42 and the peripheral surface of the roller is smaller than the contact area between the peripheral surface of the roller and the edge 41a of the slope portion 41, so that the impact during the collision is large. For this reason, although the noise and vibration are alleviated as compared with a case where the roller rides over a stepped portion parallel to the axial direction, there has been a demand for further improvement.

SUMMARY OF THE INVENTION

The invention has been devised in view of the above-described circumstances, and its object is to provide a bearing apparatus capable of substantially suppressing the noise and vibration occurring when the roller passes on the mating surfaces of the split outer ring halves.

To attain the above object, in accordance with a first aspect of the invention there is provided a bearing apparatus for supporting a shaft to a housing, comprising:

two split outer ring halves disposed in close contact with each other within a supporting hole of the housing; and a plurality of rollers which are rollably disposed on inner surfaces of the split outer ring halves for supporting the shaft, wherein a circumferential end of each of the split outer ring halves has a concave-and-convex shape including a first slope portion inclined with respect to a line extending along an axial direction of the split outer ring halves and a second slope portion inclined in an opposite direction to that of the first slope portion, wherein each of the rollers is provided with crowning so as to be shaped in barrel form, and an amount of crowning is set such that an apex of a projecting portion at the concave-and-convex shape of each of the split outer ring halves is located on an axially outer side of a rolling surface of the roller rolling on an inner peripheral surface of each of the split outer ring halves.

In the bearing apparatus in accordance with the invention, the shape of a circumferential end portion of the split outer ring half is formed into a concave-and-convex shape which includes a slope portion inclined with respect to a line extending along the axial direction and a slope portion inclined in an opposite direction to that of this slope portion. In addition, the roller serving as a rolling element is provided with crowning to form its outer shape substantially into a barrel shape, and the degree of crowning (amount of crowning) is set such that the apex of the projecting portion at the concave-and-convex shape of the split outer ring half is located axially outwardly of the rolling surface of the roller which rolls on the inner surface of the split outer ring half. Namely, since the roller is provided with crowning such that the apex of the projecting portion at the concave-and-convex shape of the split outer ring half is located axially outwardly of the rolling surface of the roller, even if a radially stepped portion has occurred at the mating surfaces of the split outer ring halves, it is possible to avoid or alleviate the collision of the roller against the apex of the projecting portion at the concave-and-convex shape. Consequently, it is possible to prevent or alleviate the occurrence of noise or vibration ascribable to the collision between the peripheral surface of the roller and the apex of the projecting portion at the concave-and-convex shape.

Preferably, the amount of crowning is set such that a distance between the peripheral surface of the roller opposing the apex of the projecting portion and the inner peripheral surface of the split outer ring half becomes greater than an amount of radial offset between the both split outer ring halves at the apex. According to this configuration, when the roller passes over the apex of the projecting portion, the peripheral surface of the roller does not come into contact with that apex. Hence, it is possible to reliably prevent the occurrence of noise and vibration ascribable to the collision between the peripheral surface of the roller and the apex of the projecting portion at the concave-and-convex shape.

Preferably, the apex of the projecting portion at the concave-and-convex shape is located axially outwardly of end surfaces of the roller. In this case, since the apex of the projecting portion at the concave-and-convex surface of the split outer ring half is located further outwardly of the rolling surface of the roller, it is possible to reliably avoid the collision of the roller against the apex of the projecting portion at the concave-and-convex shape.

According to the bearing apparatus in accordance with the invention, it is possible to substantially suppress the noise and vibration occurring when the roller passes on the mating surfaces of the split outer ring halves.

DETAILED DESCRIPTION OF PREFERRED EMBODIMENTS

Referring now to the accompanying drawings, a detailed description will be given of an embodiment of the bearing apparatus in accordance with the invention.

Figure 1:
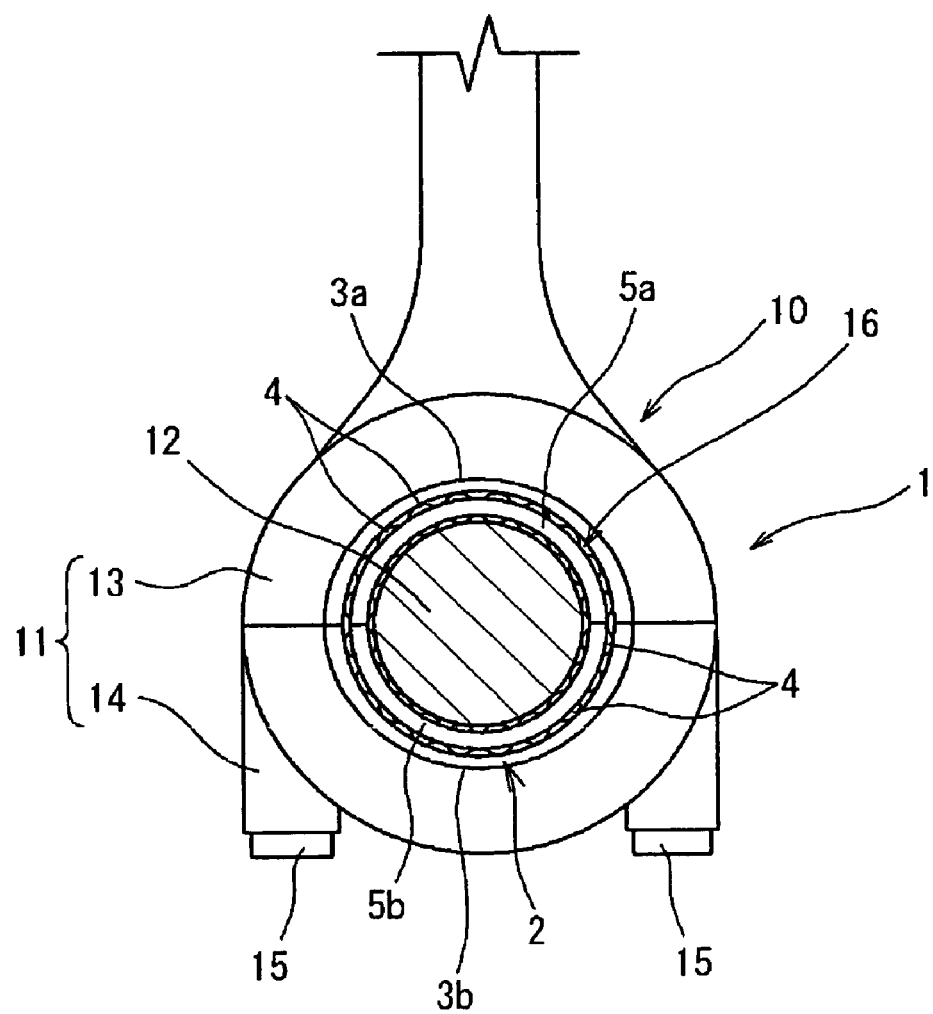
FIG. 1 is an explanatory cross-sectional view of a large end of a connecting rod to which a bearing apparatus in accordance with an embodiment of the invention is applied.

FIG. 1 is an explanatory cross-sectional view of a large end of a connecting rod to which a bearing apparatus 1 in accordance with an embodiment of the invention is applied. A connecting rod 10 has its large end 11 supported by a crankshaft 12, and an unillustrated piston is mounted to an unillustrated small end side by means of a pin.

The large end 11 is structured such that a cap portion 14 having a recessed portion having substantially semicircular cross section and serving as a second housing portion is fastened and fixed to a main body portion 13 having a recessed portion having substantially semicircular cross-section and serving as a first housing portion to thereby form a supporting hole 16 having substantially circular cross-section. A split rolling bearing 2 is incorporated in the supporting hole 16 formed by the main body portion 13 and the cap portion 14.

This rolling bearing 2 has a pair of split outer ring halves 3a and 3b disposed in close contact with each other within the supporting hole 16, a plurality or rollers 4, i.e., rolling elements, which are disposed so as to be cable of rolling on the respective inner surfaces of the both split outer ring halves 3a and 3b, and a pair of split cage halves 5a and 5b for holding the respective rollers 4 so as to dispose them at substantially equal intervals in the circumferential direction. The crankshaft 12 constitutes an inner ring member of the rolling bearing 2.

Figure 2:
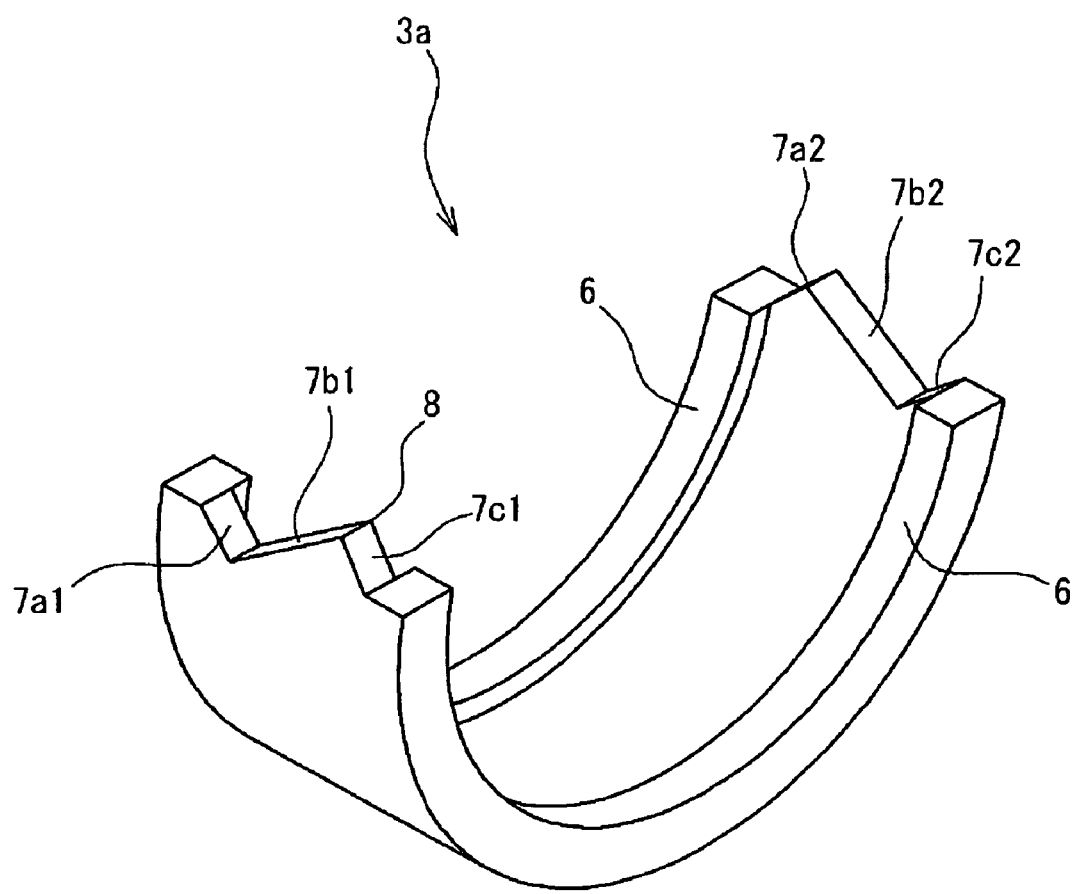
FIG. 2 is an explanatory perspective view of an example of a split outer ring half in accordance with the invention.

One split outer ring half 3a of the pair of split outer ring halves 3a and 3b is substantially semicircular, as shown in FIG. 2, and one circumferential end portion thereof (an end portion on this side in FIG. 2) has a concave-and-convex shape which includes a slope portion 7a1 inclined with respect to a line extending along the axial direction, a slope portion 7b1 inclined in an opposite direction to that of this slope portion 7a1, and a slope portion 7c1 inclined in an opposite direction to that of this slope portion 7b1. The slope portion 7a1 and the slope portion 7c1 at both ends are of the same length, whereas the slope portion 7b1 in the center is set longer than these portions. Similarly, the other circumferential end portion (an end portion on the farther side in FIG. 2) of the split outer ring half 3a also has a concave-and-convex shape which includes a slope portion 7a2 inclined with respect to a line extending along the axial direction, a slope portion 7b2 inclined in an opposite direction to that of this slope portion 7a2, and a slope portion 7c2 inclined in an opposite direction to that of this slope portion 7b2. The slope portions at one circumferential end portion and the slope portions at the other circumferential end portion are configured to be inclined in mutually opposite directions. Accordingly, as such two split outer ring halves are combined, it is possible to configure a pair of split outer ring halves. If two split outer ring halves each having a concave-and-convex shape at each of its circumferential end portions are used in combination, since the concave-and-convex shapes mesh with each other at a mating surface C (see FIGS. 3 to 6), it is possible to prevent the pair of outer ring halves from becoming offset in the axial direction. It should be noted that, in FIG. 2, reference numeral 6 denotes a rib portion formed at each side edge of the inner peripheral surface of the split outer ring half 3a, and the cage half 5a accommodating the rollers 4 is disposed between these rib portions 6.

According to the invention, the rollers 4 which roll on the inner peripheral surfaces of the split outer ring halves 3a and 3b are provided with crowning so as to be shaped in barrel form, and the amount of crowning is set such that an apex 8 of a projection in the projecting shape of each of the split outer ring halves 3a and 3b is located on an axially outer side of a rolling surface of the roller 4 rolling on the inner peripheral surface of each of these split outer ring halves 3a and 3b.

Figure 3:
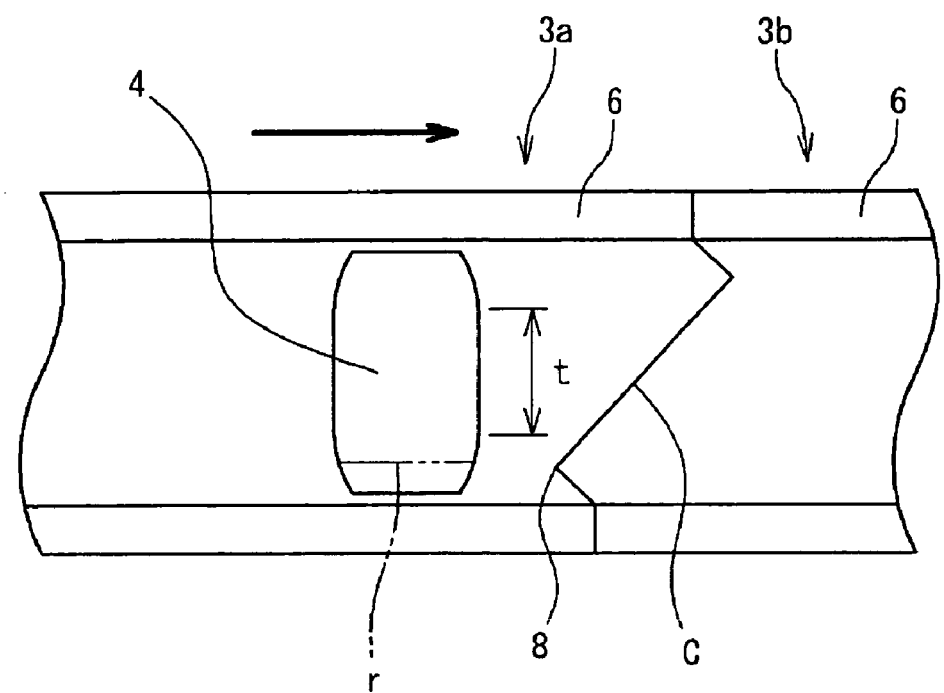
FIG. 3 is an explanatory plan view of a roller of the invention which passes a vicinity of a mating surface of the split outer ring half.

FIG. 3 is an explanatory plan view of the roller 4 of the invention which passes a vicinity of the mating surface C of the split outer ring half 3a (3b). The roller 4 is provided with crowning, and the portion of a fixed width t in the vicinity of an axially central portion is of the same diameter, but the diameter is made gradually smaller from this portion t toward the end. Further, the amount of crowning is set such that the apex 8 of the projection in the projecting shape of the circumferentially end portion of the split outer ring half 3a (3b) is located on the axially outer side of the rolling surface (peripheral surface of the fixed width t) of the roller 4.

Figure 4:
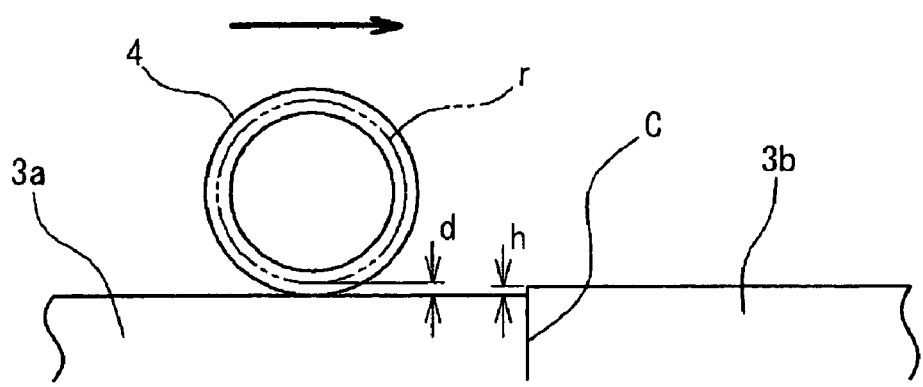
FIG. 4 is an explanatory side view of the roller shown in FIG. 2.

In addition, as shown in FIG. 4, the amount of crowning is set such that the distance d between the inner peripheral surface of the split outer ring half 3a (3b) and the peripheral surface (portion indicated at r in FIG. 3) opposing the apex 8 of the aforementioned projecting portion becomes greater than the amount of radial offset h between the both split outer ring halves at that apex 8. If the amount of crowning is thus set, when the roller 4 passes over the apex 8 of the aforementioned projecting portion, the peripheral surface r of the roller 4 does not come into contact with that apex 8. Hence, it is possible to reliably prevent the occurrence of noise and vibration ascribable to the collision between the peripheral surface r of the roller 4 and the apex 8 of the projecting portion at the concave-and-convex shape.

Figure 5:
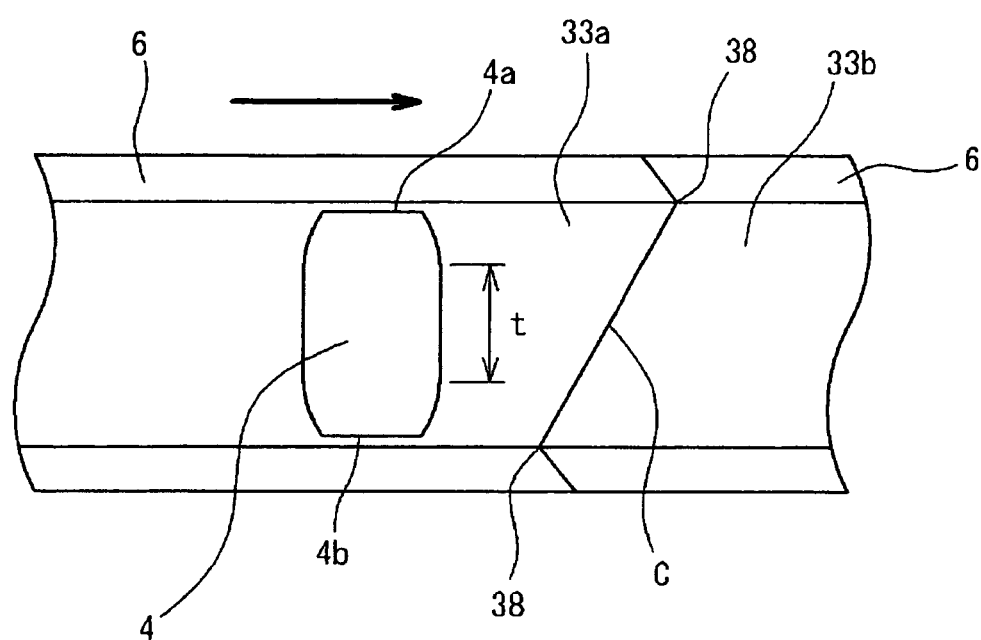
FIG. 5 is an explanatory plan view of the split outer ring halves in the bearing apparatus in accordance with another embodiment of the invention.
Figure 6:
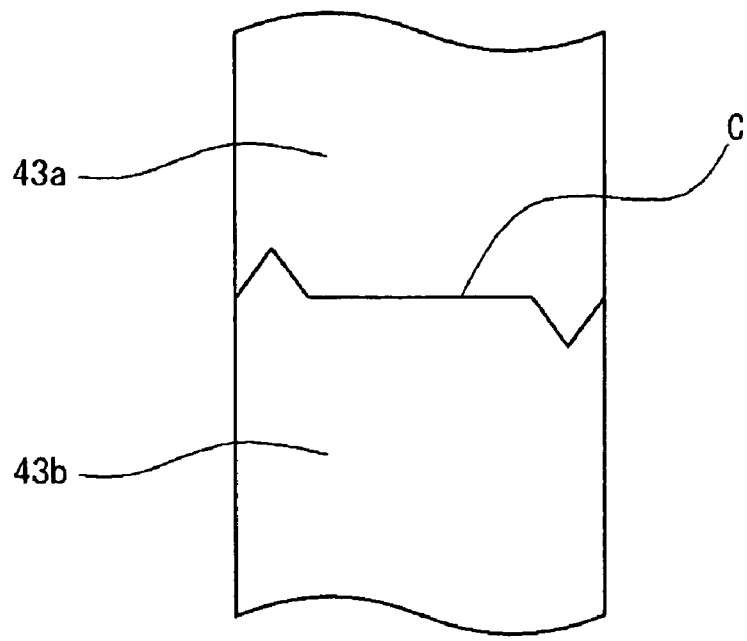
FIG. 6 is an explanatory diagram of another example of a concave-and-convex shape of a circumferential end portion of the split outer ring half.
Figure 6:
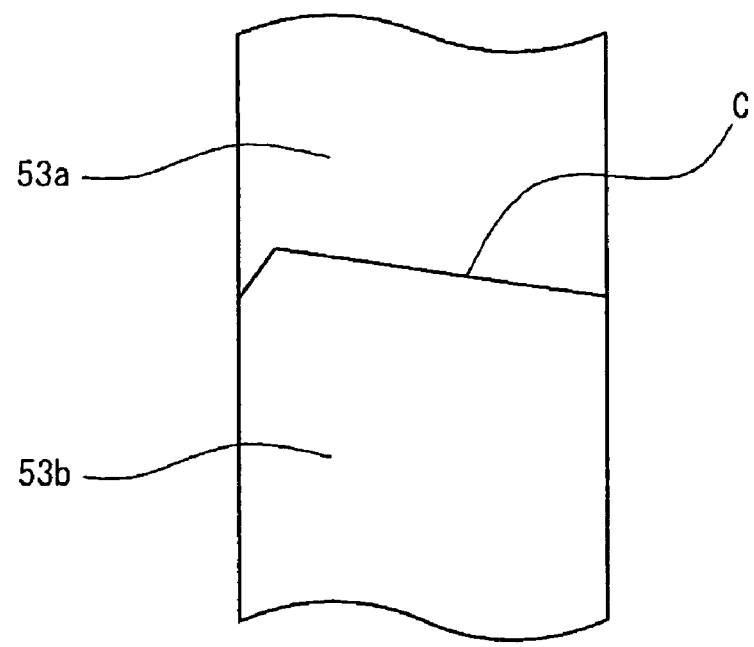

FIG. 5 is an explanatory plan view of the split outer ring halves in the bearing apparatus in accordance with another embodiment of the invention. In this embodiment, apices 38 of projecting portions at concave-and-convex shapes of split outer ring halves 33a and 33b are respectively located axially outwardly of the both end surfaces 4a and 4b of the roller 4. In this case, since the apex 38 of the projecting portion 38 is located further outwardly of the rolling surface (peripheral surface of the width indicated at t in FIG. 5) of the roller 4, it is possible to reliably avoid the collision of the roller 4 against the apex 38 of the projecting portion at the concave-and-convex shape. Hence, it is possible to reliably prevent the occurrence of noise and vibration ascribable to the collision between the peripheral surface of the roller 4 and the apex 88 of the projecting portion at the concave-and-convex shape.

It should be noted that although in the foregoing embodiments a substantially N-shape or zigzag line is adopted as the concave-and-convex shape, the invention is not limited to such a shape, and insofar as the axial offset between the combined split outer ring halves can be prevented, other shape may be adopted. For instance, it is possible to adopt a shape in which a triangular projecting portion is provided in the vicinity of one end of each of slit outer ring halves 43a and 43b and a triangular recessed portion is provided in the vicinity of the other end thereof, as shown in FIG. 6A, or a triangular shape in which an apex is provided only in the vicinity of one end of one split outer ring half 53b and a recessed portion is provided only in the vicinity of one end of the other split outer ring half 53a, as shown in FIG. 6B.

In addition, although in the foregoing embodiments the rib portion is formed at each side edge of the inner peripheral surface of each split outer ring half, the invention is applicable to split outer ring halves which do not have such rib portions.

Figure 7:
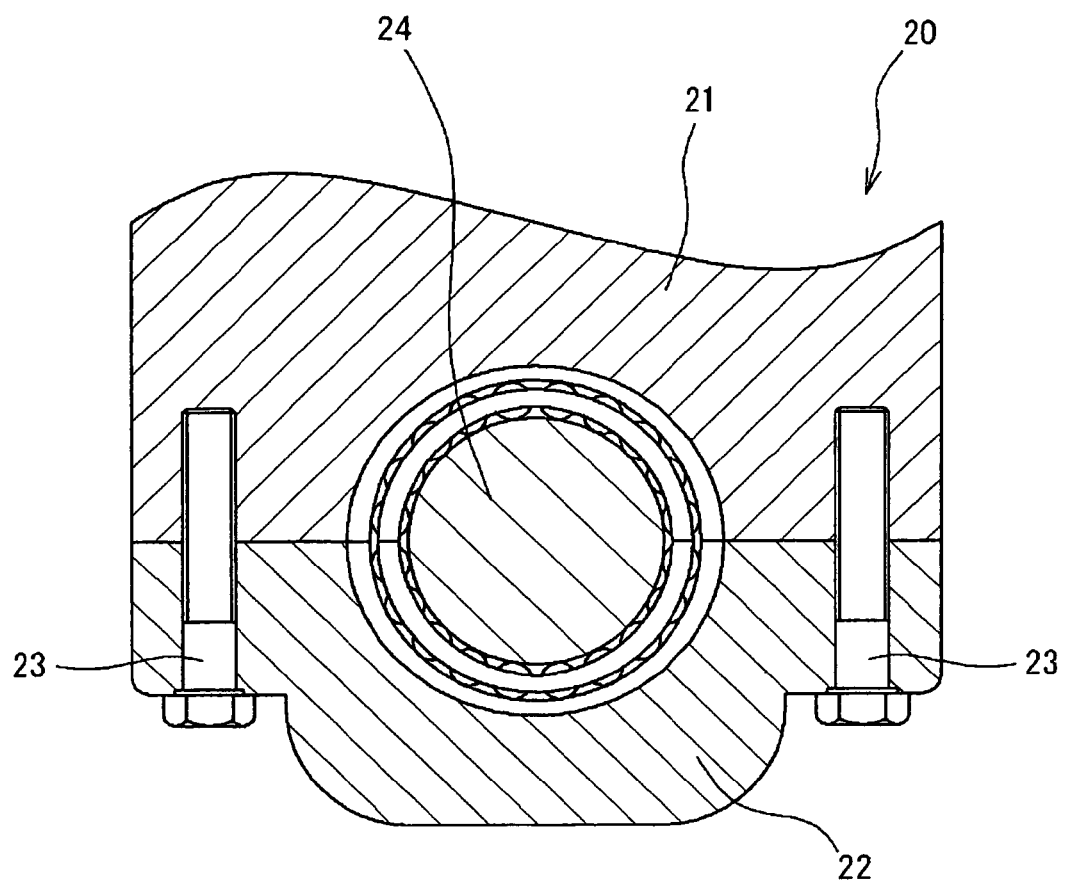
FIG. 7 is an explanatory cross-sectional view of a crankshaft fixing portion of an engine to which the bearing apparatus in accordance with the embodiment of the invention is applied.
Figure 8:
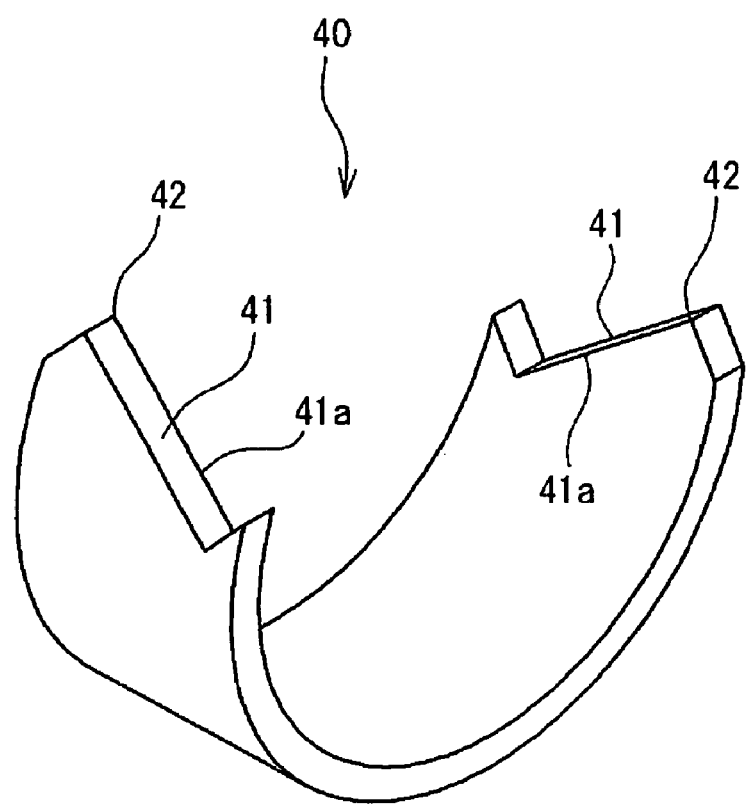
FIG. 8 is explanatory perspective view of a conventional split outer ring half.

Furthermore, although in the foregoing embodiments the bearing apparatus is applied to the large end of the connecting rod, the bearing apparatus in accordance with the invention may also be used as a crankshaft-supporting bearing which is disposed in a supporting hole formed by an upper block 21, i.e., a housing constituting a portion of a crankshaft fixing portion 20, and a lower block 22, i.e., a housing which is integrally joined to this upper block 21, as shown in FIG. 7. It should be noted that, in FIG. 7, reference numeral 23 denotes a fixing bolt for integrally fixing the upper block 21 and the lower block 22, and reference numeral 24 denotes a supporting shaft of the crankshaft.

In addition, although in the foregoing embodiments the crankshaft has been illustrated as an example of the shaft which is fitted in the bearing, the bearing apparatus in accordance with the invention is also applicable to other shafts such as a camshaft.

What is claimed is:

1. A bearing apparatus for supporting a shaft to a housing, the bearing apparatus comprising:
    two split outer ring halves disposed in close contact with each other within a supporting hole of the housing; and
    a plurality of rollers which are rollably disposed on inner surfaces of the split outer ring halves for supporting the shaft,
    wherein a circumferential end of each of the split outer ring halves has a concave-and-convex shape including a first slope portion inclined with respect to a line extending along an axial direction of the split outer ring halves and a second slope portion inclined in an opposite direction to that of the first slope portion,
    wherein each of the rollers is provided with crowning so as to be shaped in a barrel form, and an amount of said crowning is set such that an apex of a projecting portion at the concave-and-convex shape of each of the split outer ring halves is located on an axially outer side of a rolling surface of said each of the rollers rolling on an inner peripheral surface of each of the split outer ring halves, and
    wherein the amount of said crowning is set such that a distance, perpendicular to an axis of said each of the rollers, between a peripheral surface of said each of the rollers opposing the apex of the projecting portion and the inner peripheral surface of each of the split outer ring halves is greater than an amount of radial offset between the split outer ring halves at the apex, said radial offset being greater than zero.

2. The bearing apparatus according to claim 1, wherein the apex of the projecting portion at the concave-and-convex shape is located axially outwardly of end surfaces of said each of the rollers.

3. The bearing apparatus according to claim 1, further comprising two split cage halves which hold the rollers so as to dispose the rollers at substantially equal intervals in a circumferential direction.

4. The bearing apparatus according to claim 1, further comprising:
    a rib portion formed at side edges of the inner surfaces of the split outer ring halves.

5. The bearing apparatus according to claim 4, wherein the rib portion is formed at each of the side edges of each of the inner surfaces of the split outer ring halves.

6. The bearing apparatus according to claim 4, wherein the first slope portion inclines from an edge of the rib portion.

7. The bearing apparatus according to claim 4, further comprising split cage halves which hold the rollers, said split cage halves abutting the rib portion.

8. The bearing apparatus according to claim 4, wherein the apex of the projecting portion at the concave-and-convex shape is located axially between an end surface of said each of the rollers and the rib portion.

9. The bearing apparatus according to claim 4, wherein the apex of the projecting portion at the concave-and-convex shape is located axially between the rolling surface of said each of the rollers and the rib portion.

* * * * *